(12) United States Patent
Miller-Smith

(10) Patent No.: US 7,091,998 B2
(45) Date of Patent: Aug. 15, 2006

(54) IMAGE CONTROL SYSTEM

(75) Inventor: Richard M. Miller-Smith, Lingfield (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 259 days.

(21) Appl. No.: 10/003,056

(22) Filed: Nov. 2, 2001

(65) Prior Publication Data
US 2003/0164818 A1 Sep. 4, 2003

(30) Foreign Application Priority Data
Nov. 8, 2000 (GB) .................. 0027260.9

(51) Int. Cl.
*G09G 5/00* (2006.01)

(52) U.S. Cl. ............ 345/810; 345/156; 345/157; 345/676; 345/700; 345/835; 345/857; 348/563; 348/564

(58) Field of Classification Search ........ 345/156, 345/157, 161, 173, 676, 684, 700, 701, 810, 345/819, 820, 835, 836, 846, 856, 857; 348/114, 348/552, 563, 564, 734
See application file for complete search history.

(56) References Cited

U.S. PATENT DOCUMENTS

| | | | |
|---|---|---|---|
| 4,736,191 A * | 4/1988 | Matzke et al. ............. 341/20 |
| 5,428,406 A | 6/1995 | Terasawa ................. 348/734 |
| 5,515,044 A | 5/1996 | Glatt ...................... 341/22 |
| 5,627,531 A * | 5/1997 | Posso et al. .............. 341/22 |
| 5,667,319 A * | 9/1997 | Satloff ................... 400/472 |
| 5,670,955 A | 9/1997 | Thorne, III et al. ....... 341/34 |
| 5,736,703 A * | 4/1998 | Kim ...................... 200/1 B |
| 5,940,076 A * | 8/1999 | Sommers et al. .......... 345/834 |
| 5,986,638 A * | 11/1999 | Cheng ................... 345/857 |
| 6,058,319 A * | 5/2000 | Sadler ................. 455/569.2 |
| 6,208,335 B1 * | 3/2001 | Gordon et al. ........... 345/721 |
| 6,405,061 B1 * | 6/2002 | Bae ...................... 455/566 |
| 6,411,275 B1 * | 6/2002 | Hedberg ................. 345/156 |
| 6,411,307 B1 * | 6/2002 | Rosin et al. ............. 345/716 |
| 6,448,987 B1 * | 9/2002 | Easty et al. ............. 345/834 |
| 6,501,516 B1 * | 12/2002 | Clapper ................. 348/734 |
| 2004/0070567 A1 * | 4/2004 | Longe et al. ............ 345/156 |

FOREIGN PATENT DOCUMENTS

| | | |
|---|---|---|
| DE | 19855022 A | 11/1998 |
| EP | 0767418 A1 | 4/1997 |
| EP | 1028570 A1 | 2/1999 |
| EP | 0944218 A1 | 9/1999 |

(Continued)

*Primary Examiner*—Bipin Shalwala
*Assistant Examiner*—Vincent E. Kovalick
(74) *Attorney, Agent, or Firm*—Michael E. Belk

(57) ABSTRACT

An image control system for controlling a menu on a display, comprises a menu arranged as a plurality of simultaneously displayed menu items in a loop and a selector (12) to select an item from the menu, the loop and the selector being moveable with respect to each other. A user input device (4) comprises a control device (6; 16) to generate a control signal to move the loop and the selector (12) relative to each other. The control device (6; 16) has a loop configuration, with movement around the loop of the control device causing corresponding relative movement between the selector (12) and the loop of the menu. Correlation between the loop configuration of the control device and the loop of menu items enables a user to intuitively navigate around a menu of items and select a desired one.

20 Claims, 1 Drawing Sheet

FOREIGN PATENT DOCUMENTS

Figure 1:
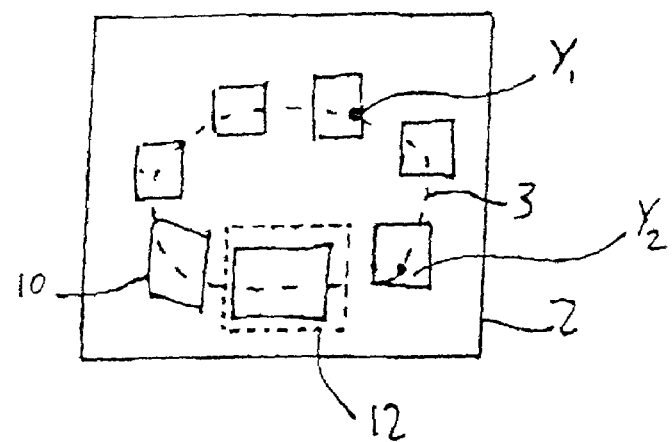
Figure 1:
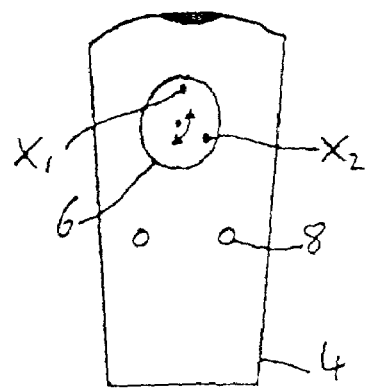

| | | |
|---|---|---|
| GB | 2313246 | 11/1997 |
| WO | WO9304491 | 3/1993 |
| WO | WO9413107 | 12/1993 |
| WO | WO9516975 | 6/1995 |
| WO | WO9828912 | 11/1997 |
| WO | WO9831116 | 12/1997 |
| WO | WO9927435 | 11/1998 |
| WO | WO0116690 | 8/2000 |

* cited by examiner

IMAGE CONTROL SYSTEM

The present invention relates to an image control system and in particular to a system for controlling a menu used to display a selection of items such as, for example, television channels or functions of a mobile telephone.

In systems such as televisions or mobile telephones it is common to have a menu displaying a number of items from which a user is invited to choose. In a television system the items may be different television channels or control-functions of the television such as volume, colour or contrast, whereas in a mobile telephone they are likely to be names and numbers in a stored directory or functions of the telephone such as "ANSWER" or "DIVERT" etc. In digital or cable television systems there are typically many channels. In addition, television systems exist that are capable of displaying different types of information such as the internet as well as conventional television pictures. Mobile telephone menus may also have many items to display. To simplify the selection process for a user, it is desirable to display more than one menu item at any one time.

Referring to television systems, one method of achieving this is to display the channels in an array on the television screen. The array is typically arranged by dividing the television screen up into a number of rows and columns, each element in the array displaying a different channel. With a remote control, a user moves a cursor up, down, left or right in the array to arrive at an image showing a desired channel. Upon selection, the image is transferred to the whole screen for watching.

However, in these systems it is both laborious and confusing for a user to navigate the cursor to a selected position to select any particular channel. Similarly, it can be difficult to navigate such an array on a mobile telephone handset display.

It is therefore an object of the present invention to provide an improved image control system.

According to the present invention, there is provided an image control system for controlling a menu on a display, comprising:

a menu for a display, the menu being arranged as a plurality of simultaneously displayed menu items in a loop;

a selector to select an item from the menu, the loop and the selector being moveable with respect to each other; and, a user input device for inputting an instruction from a user for selecting the menu items from the menu, wherein the user input device comprises a control device to generate a control signal to move the loop and the selector relative to each other, the control device having a loop configuration, wherein movement around the loop configuration of the control device causes a corresponding relative movement between the selector and the loop of the menu.

The present invention provides an image control system for controlling the orientation of a menu or a selector around a menu wherein the menu is made up of a number of simultaneously displayed items arranged in a loop. Correlation between the loop configuration of the control device and the loop of menu items enables a user to intuitively navigate around a menu of items and select a desired one.

Preferably, the menu is displayed as a three-dimensional image such as a carousel. In one example, the menu itself rotates and a selector region is provided on a display used to display the menu. In an alternative example, the menu remains stationary and the selector is a cursor arranged to move around the loop in response to the control signal.

By controlling the user input device, the user is able to move the menu and the selector region relative to each other, effectively rotating the carousel so that at any one time the item displayed in the selector region on the display can be controlled.

In one example, the control device is a rotatable control wherein rotation of the control causes a corresponding rotation of the menu. In another example, the control device comprises an annular pressure pad to receive pressure from a user and generate the control signal corresponding to the angular position on the pressure pad at which pressure is applied.

Preferably, the user input device comprises at least one force-sensing resistor to receive a force from a user and generate the control signal in dependence on this. The use of an on-screen carousel together with a user input device having a force-sensing resistor enables a user to intuitively control and select the item being displayed on the screen at any time, thereby simplifying an item selection process.

Figure 2:
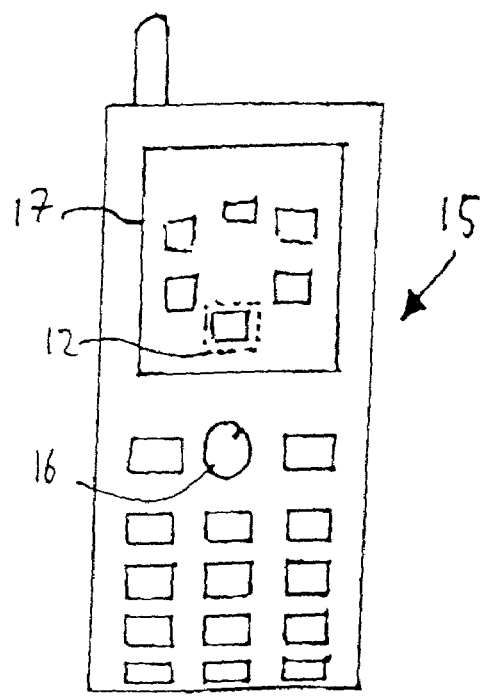

Examples of the present invention will now be described in detail with reference to the accompanying drawing, in which:

FIG. 1 shows a schematic representation of a television and a remote control unit having an image control system according to the present invention; and, FIG. 2 shows a schematic representation of a mobile telephone according to the present invention.

FIG. 1 shows a schematic representation of a television and remote control unit having an image control system according to the present invention. The television has a conventional screen 2 and a remote control unit 4 arranged to implement the image control system. In this example, the remote control unit 4 has a rotary control device 6, which is used to control the position or movement of a menu on the screen 2.

As will be explained below, when a user selects a menu function on the remote control unit 4 by, for example, pressing a dedicated button 8 or simply by depressing the control device 6, a menu appears on the screen 2 of the television. In this example, the menu is in the form of a three-dimensional carousel 3 having a number of items 10 each of which is arranged to display the images associated with a particular television channel or type of information such as television, internet, video-on-demand etc. The menu items may also be control functions of the television system such as volume, contrast or colour etc. Any form for the menu would be suitable so long as it is a continuous shape, which enables continuous navigation. Further examples of suitable shapes include a two-dimensional circle or ellipse. The menu items need not form a complete loop and if there are gaps in the menu this does not affect the operation of the control system. In the example shown in FIG. 1, a selector region 12 is provided at a position on the screen corresponding to the front most portion of the carousel 3.

To switch channel on the television, a user must rotate the carousel 3 so that a selected channel image is displayed within the selector region 12. Once this has been achieved, the selected image is transferred to the main screen 2 of the television. Since a single channel is usually shown on the television screen 2 at any point in time, a user must first "call-up" the menu on the screen 2. This can be done for example by depressing the control device 6 or by pressing a dedicated button on the remote control 4.

As will be explained below, the control device 6 must be a control device that enables continual movement e.g. circular movement, about a loop configuration on the remote control unit 4 to correspond to rotary movement of the menu or a cursor identified with a particular menu item on the screen 2. In one example, the user rotates a housing of the control device 6, the movement of which is detected by a sensor arrangement provided in the remote control unit 4. Any other suitable form of position encoder can be used to determine a control signal generated by the device 6 to control the movement and orientation of the menu on the screen.

In an alternative example, the control device can be an annular pressure-sensitive pad so that sliding movement of a user's finger over the control device can be detected by the sensor arrangement and mapped to movement of the carousel on the screen 2.

In both examples, the control device has a loop configuration so that there is a correlation with the carousel 3. This is shown in FIG. 1 by the points $X_1$, $X_2$, $Y_1$ and $Y_2$. A rotation of the control device 6 through an angle of, say, 45° from point $X_1$ to $X_2$, will cause a corresponding rotation of the carousel 3 so that point $Y_1$ will move to the point $Y_2$ on the screen 2. This correlation provides intuitive control of the menu to a user, simplifying the process of selection of a menu item.

The creation of the carousel of images is controlled by circuitry (not shown) and/or software within the television itself. The television has a receiver (not shown) constantly receiving signals from all available television channels. Usually a single one of the channels is selected and displayed on the screen 2 in accordance with a user's choice. In the present invention, when activated in response to a signal from the remote control unit 4, the on-screen carousel 3 of menu items is generated by the circuitry within the television. Details of a suitable system for creating such a display are disclosed in European Patent Application number EP0,767,418 in the name of SONY Corporation, the contents of which are incorporated herein by reference. In this document, a pre-programmed central processing unit is used to generate the graphics to create the carousel effect on the display.

In one example of the present invention, to enable the correlation between the on-screen carousel and the control device 6 of the remote control 4, one or more force-sensing resistors are used. International Patent application number WO95/16975 in the name of INTERLINK ELECTRONICS INC., the contents of which are incorporated herein by reference, discloses one example of a force-sensing resistor arrangement suitable for use in the present invention although other examples will be known to a man skilled in the art.

In the device disclosed in WO95/16975, an array of four force-sensing resistors is provided including a sensor substrate, a semiconductor layer and resistors arranged in an interdigitated pattern. A common potential is provided, isolated from the interdigitated resistors. The semiconductor layer is arranged so that when no force is applied it does not contact any of the resistors but as a user applies a force at a position on the array, the semiconductor layer is brought into contact with the resistor pattern at that position thereby connecting one or more of the resistors with the common potential. An output signal is generated which is dependent on the position on the array at which the force was applied thereby enabling the signal to be decoded and the position to be determined. The television receives the signal from the remote control unit 4 and determines the orientation of the carousel 3 in dependence on this. Movement of the control device 6 causes a change in the signal provided by the force-sensing resistors which is used to cause corresponding movement of the menu.

In an alternative embodiment, a cursor (not shown) is viewed on the menu screen that follows the menu items in the carousel as a user operates the control device 6. In other words, instead of the carousel 3 rotating in response to the signal provided by the remote control unit 4, in this case the carousel remains stationary and the cursor is moved sequentially from item to item. The cursor could be a highlighted background or an actual symbol that moves from item to item in the menu such as, for example, a star symbol or a tick.

In both embodiments of the present invention, a user interface is provided with a remote control unit having an input device that can receive inputs over a complete cycle. The angular range of the control device could however be limited to some fraction of a complete cycle usually corresponding to the angular range of the menu. Additionally, the control device need not be continuous in the sense that instead of providing a continuously changing signal over the angular range, a signal could be generated for each of a fixed number of predetermined angular positions e.g. twelve positions at an angular spacing of 30°.

FIG. 2 shows a schematic representation of a mobile telephone handset 15 according to the present invention. As mentioned above, the invention is also applicable to mobile telephone menus. The menu on the screen of the telephone handset in FIG. 2 is shown as a two-dimensional circle although clearly any suitable form of menu would work equally well. A dial 16 is provided on the front face of the handset 15 i.e. the face of the handset that contains all the conventional controls such as the keypad etc. The handset 15 preferably has all the usual features of a mobile telephone with the addition of the rotary dial 16 positioned on the front face.

On activation of the menu of the mobile telephone handset 15, the dial 16 operates in substantially the same manner as the control device 6 described above with reference to the television system. Of course, there is no transmission of a remote control signal as there is in the television example, but rather the signal is coupled to the display within the handset. To select an item from the menu a user rotates the dial 16 until either the cursor has moved to be associated with the desired menu item or the menu has rotated so that the desired item has come into alignment with a selector region 12 on the screen 17 of the mobile telephone handset 15.

The invention claimed is:

1. An image control system for controlling a menu on a display, comprising:
   a menu for a display, the menu being arranged as a plurality of simultaneously displayed menu items in a loop;
   a selector to select a item from the menu, the loop and the selector being moveable with reaped to each other; and
   a user input device for inputting an instruction from a user for selecting said menu items from the menu, wherein the user input device comprises a control device to generate a control signal to move the loop and the selector relative to each other, the control device having a loop configuration, wherein movement around the loop configuration of the control device causes a corresponding relative angular movement that is substantially equal between the selector and the loop of the menu.

2. A system according to claim 1, wherein the user input device comprises at least one force-sensing resistor to receive a force from a user and generate the control signal in dependence on this.

3. A system according to claim 1, wherein the control device is a rotary control, rotatable through 360° to generate the control signal in dependence on the angular position of the control device about the loop configuration to control the position or the movement of the menu and the selector relative to each other.

4. A system according to claim 1, wherein the control device is an annular pressure pad to receive pressure from a user and generate the control signal corresponding to the angular position on the pressure pad at which pressure is applied.

5. A system according to claim 1, wherein the menu is ranged in a substantially circular form and wherein change in the control signal causes rotation of the circle with respect to a predetermined point of rotation.

6. A system according to claim 1, wherein the menu is arranged in a carousel arrangement and is displayed in three dimensions on the display.

7. A system according to claim 1, wherein the user input device is a joystick.

8. A system according to claim 1, wherein die user input device is a joystick and the user input device further comprises at least one force-sensing resistor to receive a force from a user and generate the control signal in dependence on this.

9. A television comprising a control system according to claim 1, in which the display is a television screen and the user input device is a television remote control.

10. A mobile telephone handset having a control system according to claim 1, in which the display is the mobile telephone handset display screen and the input device is a rotary control positioned on the front face of the mobile telephone handset.

11. A mobile telephone handset having a control system according to claim 1, in which the display is the mobile telephone handset display screen and the control device is an annular pressure pad to receive pressure from a user and generate the control signal corresponding to the angular position on the pressure at which pressure is applied.

12. An image control system for controlling a menu on a display, comprising:
    a menu for a display, the menu being arranged as a plurality of simultaneously displayed menu items in a loop;
    a selector within the display for selecting one of the items from the menu, the loop and the selector being moveable with respect to each other; and
    a user input device for providing user input for selecting said menu items from the menu, the user input device having an annular control device that generates a control signal to move the loop and the selector relative to each other, wherein users can execute a continuous circular movement upon the annular control device causing a corresponding relative angular movement that is substantially equal between the selector and the loop of the menu.

13. A system according to claim 12, wherein the annular control device comprises at least one force-sensing resistor to receive a force from a user and generate the control signal in dependence on this.

14. A system according to claim 13, wherein the annular control device is a rotary control, to generate the control signal in dependence on the angular position of the control device about the loop configuration to control the position or the movement of the menu and the selector relative to each other.

15. A system according to claim 12, wherein the annular control device further comprises a pressure pad to generate the control signal in response to an angular position on the pressure at which pressure is applied to create a corresponding movement in the loop and the selector relative to each other.

16. A system according to claim 12, wherein the menu is arranged in a substantially circular form and wherein changes in the control signal cause rotation of the circle with respect to a predetermined point of rotation.

17. A system according to claim 12, wherein the menu is arranged in a carousel arrangement and is displayed in three dimensions on the display.

18. A system according to claim 12, wherein the user input device is a joystick and the user input device further comprises at least one force-sensing resister to receive a force from a user and generate the control signal in dependence on this.

19. A mobile telephone handset having a control system according to claim 12, in which the display is the mobile telephone handset display screen and the control device is an annular pressure pod to receive pressure from a user and generate the control signal corresponding to the angular position on the pressure pad at which pressure is applied.

20. A system according to claim 12, wherein the continuous circular movement upon the annular control device causes the corresponding relative movement between the selector and the loop of the menu in a series of discrete steps.

* * * * *